(12) United States Patent
Davis et al.

(10) Patent No.: US 12,387,626 B1
(45) Date of Patent: *Aug. 12, 2025

(54) BUSINESS FORM AND METHODS OF MAKING AND USING SAME

(71) Applicant: Rekon, LLC, Pittsburg, KS (US)

(72) Inventors: Roger Davis, Garland, KS (US); Gina Staudinger, Louisburg, KS (US); Jesse D. Crum, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 367 days.

This patent is subject to a terminal disclaimer.

(21) Appl. No.: 18/171,871

(22) Filed: Feb. 21, 2023

Related U.S. Application Data

(63) Continuation of application No. 16/426,708, filed on May 30, 2019, now Pat. No. 11,587,470, which is a
(Continued)

(51) Int. Cl.
*G09F 3/10* (2006.01)
*B42D 25/00* (2014.01)
(Continued)

(52) U.S. Cl.
CPC .............. *G09F 3/10* (2013.01); *B42D 25/00* (2014.10); *C08J 7/04* (2013.01); *C09J 5/00* (2013.01); *C09J 7/401* (2018.01); *C09J 11/04* (2013.01); *G09F 3/005* (2013.01); *G09F 3/0288* (2013.01); *C08K 2003/3045* (2013.01); *C08K 3/36* (2013.01); *C09J 2483/005* (2013.01); *G09F 2003/0201* (2013.01); *G09F 2003/023* (2013.01); *Y10T 156/10* (2015.01)

(58) Field of Classification Search
CPC .......... G09F 3/005; G09F 3/10; G09F 3/0288; G09F 2003/0201; G09F 2003/023; B42D 25/00

See application file for complete search history.

(56) References Cited

U.S. PATENT DOCUMENTS

| | | |
|---|---|---|
| 230,455 A | 7/1880 | Wilcox |
| 919,983 A | 4/1909 | Walsh |
| (Continued) | | |

FOREIGN PATENT DOCUMENTS

| | | |
|---|---|---|
| DE | 1039431 B | 9/1958 |
| EP | 1974603 A2 | 10/2008 |
| (Continued) | | |

OTHER PUBLICATIONS

Final Office Action, dated Jul. 8, 2021, 9 pages, issued in U.S. Appl. No. 17/013,065.
(Continued)

*Primary Examiner* — Carson Gross
(74) *Attorney, Agent, or Firm* — AVEK IP, LLC

(57) ABSTRACT

Business forms comprises control bond adhesive and methods of making and using same. A method of making a business form includes using a control bond adhesive created by mixing: (i) a first quantity of an adhesive; (ii) a second quantity of water; (iii) a third quantity of gypsum; and (iv) a fourth quantity of fumed silica. The method includes removably securing a first portion of said business form to a second portion of said business form.

20 Claims, 5 Drawing Sheets

Related U.S. Application Data continuation-in-part of application No. 15/676,670, filed on Aug. 14, 2017, now Pat. No. 10,325,525, which is a continuation-in-part of application No. 15/180,593, filed on Jun. 13, 2016, now abandoned.

(60) Provisional application No. 62/256,465, filed on Nov. 17, 2015, provisional application No. 62/247,863, filed on Oct. 29, 2015, provisional application No. 62/175,055, filed on Jun. 12, 2015.

(51) Int. Cl.
  *C08J 7/04* (2020.01)
  *C08K 3/30* (2006.01)
  *C08K 3/36* (2006.01)
  *C09J 5/00* (2006.01)
  *C09J 7/40* (2018.01)
  *C09J 11/04* (2006.01)
  *G09F 3/00* (2006.01)
  *G09F 3/02* (2006.01)

(56) References Cited

U.S. PATENT DOCUMENTS

| | | |
|---|---|---|
| 922,948 A | 5/1909 | Portmore |
| 1,039,431 A | 9/1912 | Moore |
| 1,383,335 A | 7/1921 | Stanley |
| 1,517,456 A | 12/1924 | Edward |
| 2,054,227 A | 9/1936 | Shelby |
| 2,073,280 A | 3/1937 | Lederer |
| 2,553,676 A | 5/1951 | Jacob |
| 2,641,074 A | 6/1953 | Richmond |
| 2,687,978 A | 8/1954 | Vogt |
| 2,914,166 A | 11/1959 | Bihler |
| 3,153,869 A | 10/1964 | Twentier |
| 3,197,899 A | 8/1965 | Twentier |
| 3,402,808 A | 9/1968 | Anthony |
| 3,517,802 A | 6/1970 | Petrie |
| 3,585,743 A | 6/1971 | Jeffers |
| 3,660,916 A | 5/1972 | Mcdermott et al. |
| 3,854,229 A | 12/1974 | Morgan |
| 4,004,362 A | 1/1977 | Barbieri |
| 4,078,324 A | 3/1978 | Wiebe |
| 4,138,234 A | 2/1979 | Kubesa |
| 4,179,833 A | 12/1979 | Knodel |
| 4,226,036 A | 10/1980 | Krug |
| 4,233,715 A | 11/1980 | McDermott |
| 4,314,415 A | 2/1982 | Woskin |
| 4,318,234 A | 3/1982 | Charles et al. |
| 4,370,370 A | 1/1983 | Iwata et al. |
| 4,565,731 A | 1/1986 | Komatsu et al. |
| 4,612,718 A | 9/1986 | Golub et al. |
| 4,627,994 A | 12/1986 | Welsch |
| 4,630,384 A | 12/1986 | Breen |
| 4,682,431 A | 7/1987 | Kowalchuk |
| 4,696,843 A | 9/1987 | Schmidt |
| 4,783,917 A | 11/1988 | Smith et al. |
| 4,829,604 A | 5/1989 | Allen et al. |
| 4,854,610 A | 8/1989 | Kwiatek |
| 4,855,277 A | 8/1989 | Walter |
| 4,914,843 A | 4/1990 | DeWoskin |
| 4,941,210 A | 7/1990 | Konucik |
| 4,950,638 A | 8/1990 | Yuyama et al. |
| 4,956,931 A | 9/1990 | Selke |
| D312,654 S | 12/1990 | Giordano |
| 4,978,144 A | 12/1990 | Schmidt et al. |
| 4,991,337 A | 2/1991 | Solon |
| RE33,616 E | 6/1991 | Welsch |
| 5,026,084 A | 6/1991 | Pasfield |
| 5,031,382 A | 7/1991 | Boyle |
| 5,045,426 A | 9/1991 | Maierson et al. |
| 5,048,870 A | 9/1991 | Mangini et al. |
| 5,103,583 A | 4/1992 | VanErmen |
| 5,135,789 A | 8/1992 | Schmidt |
| 5,222,823 A | 6/1993 | Conforti et al. |
| 5,227,004 A | 7/1993 | Belger |
| 5,227,209 A | 7/1993 | Garland |
| 5,283,969 A | 2/1994 | Weiss |
| 5,311,689 A | 5/1994 | Lindsey |
| 5,318,326 A | 6/1994 | Garrison |
| 5,331,140 A | 7/1994 | Stephany |
| 5,351,993 A | 10/1994 | Wright et al. |
| 5,364,133 A | 11/1994 | Hofer et al. |
| 5,370,420 A | 12/1994 | Khatib et al. |
| 5,381,617 A | 1/1995 | Schwartztol et al. |
| 5,383,686 A | 1/1995 | Laurash |
| 5,395,667 A | 3/1995 | Ohno et al. |
| 5,401,110 A | 3/1995 | Neeley |
| 5,418,026 A | 5/1995 | Dronzek, Jr. et al. |
| 5,421,942 A | 6/1995 | Hoffmann |
| 5,423,574 A | 6/1995 | Forte-Pathroff |
| 5,427,416 A | 6/1995 | Birch |
| 5,448,846 A | 9/1995 | Peterson et al. |
| 5,457,906 A | 10/1995 | Mosher, Jr. |
| 5,486,021 A | 1/1996 | Laurash |
| 5,486,436 A | 1/1996 | Dale |
| 5,509,693 A | 4/1996 | Kohls |
| 5,509,694 A | 4/1996 | Laurash et al. |
| 5,518,787 A | 5/1996 | Konkol |
| 5,524,934 A | 6/1996 | Schwan et al. |
| 5,547,227 A | 8/1996 | Laurash et al. |
| 5,560,657 A | 10/1996 | Morgan |
| 5,562,789 A | 10/1996 | Hoffmann |
| 5,581,924 A | 12/1996 | Peterson |
| 5,586,788 A | 12/1996 | Laurash |
| 5,595,404 A | 1/1997 | Skees |
| 5,596,202 A | 1/1997 | Arakawa |
| 5,598,970 A | 2/1997 | Mudry et al. |
| 5,601,222 A | 2/1997 | Haddad |
| 5,601,313 A | 2/1997 | Konkol et al. |
| 5,630,627 A | 5/1997 | Stewart |
| 5,637,369 A | 6/1997 | Stewart |
| 5,648,143 A | 7/1997 | Mehta et al. |
| 5,653,472 A | 8/1997 | Huddleston et al. |
| 5,662,976 A | 9/1997 | Popat et al. |
| 5,670,015 A | 9/1997 | Finestone et al. |
| 5,687,903 A | 11/1997 | Akridge et al. |
| 5,721,178 A | 2/1998 | Lalande |
| D391,991 S | 3/1998 | Connor |
| 5,752,722 A | 5/1998 | Moore et al. |
| 5,765,885 A | 6/1998 | Netto |
| 5,785,354 A | 7/1998 | Haas |
| 5,837,337 A | 11/1998 | Schnitzer |
| 5,837,341 A | 11/1998 | Johnstone |
| 5,840,143 A | 11/1998 | Swanson |
| 5,842,722 A | 12/1998 | Carlson |
| 5,877,742 A | 3/1999 | Klink |
| 5,933,993 A | 8/1999 | Riley |
| 5,984,363 A | 11/1999 | Dotson et al. |
| 6,000,160 A | 12/1999 | Riley |
| 6,006,460 A | 12/1999 | Blackmer |
| 6,016,618 A | 1/2000 | Attia et al. |
| D423,044 S | 4/2000 | Burke et al. |
| 6,053,535 A | 4/2000 | Washburn et al. |
| 6,055,756 A | 5/2000 | Aoki |
| 6,058,639 A | 5/2000 | Tinklenberg et al. |
| 6,067,739 A | 5/2000 | Riley |
| 6,071,585 A | 6/2000 | Roth |
| 6,092,321 A | 7/2000 | Cheng |
| 6,108,876 A | 8/2000 | Hubbert |
| 6,155,476 A | 12/2000 | Fabel |
| 6,155,603 A | 12/2000 | Fox |
| 6,159,570 A | 12/2000 | Ulrich et al. |
| 6,199,730 B1 | 3/2001 | Chisolm |
| D448,404 S | 9/2001 | Hamilton et al. |
| 6,303,539 B1 | 10/2001 | Tony |
| 6,331,018 B1 | 12/2001 | Roth et al. |
| 6,343,819 B1 | 2/2002 | Shiozaki |
| 6,361,078 B1 | 3/2002 | Chess |
| 6,364,366 B1 | 4/2002 | Schwartz |
| 6,409,871 B1 | 6/2002 | Washburn et al. |
| 6,438,881 B1 | 8/2002 | Riley |
| 6,510,634 B1 | 1/2003 | Riley |

(56) References Cited

U.S. PATENT DOCUMENTS

| | | | |
|---|---|---|---|
| 6,517,921 | B2 | 2/2003 | Ulrich et al. |
| D473,264 | S | 4/2003 | Sanford et al. |
| 6,611,962 | B2 | 9/2003 | Redwood et al. |
| 6,641,048 | B1 | 11/2003 | Schintz et al. |
| 6,685,228 | B2 | 2/2004 | Riley |
| 6,748,687 | B2 | 6/2004 | Riley |
| 6,782,648 | B1 | 8/2004 | Mosher, Jr. |
| 6,807,680 | B2 | 10/2004 | Sloot |
| 6,836,215 | B1 | 12/2004 | Laurash et al. |
| 6,844,041 | B2 | 1/2005 | Squier et al. |
| D503,197 | S | 3/2005 | Stewart et al. |
| 6,863,311 | B2 | 3/2005 | Riley |
| 6,971,200 | B2 * | 12/2005 | Valenti, Jr. ....... G06K 19/07762 340/572.1 |
| 6,981,948 | B2 | 1/2006 | Pellegrino et al. |
| 7,017,293 | B2 | 3/2006 | Riley |
| 7,017,294 | B2 | 3/2006 | Riley et al. |
| D521,565 | S | 5/2006 | Stewart et al. |
| 7,047,682 | B2 | 5/2006 | Riley |
| 7,197,842 | B2 | 4/2007 | Ali |
| 7,222,448 | B2 | 5/2007 | Riley |
| 7,240,446 | B2 | 7/2007 | Bekker |
| 7,286,055 | B2 | 10/2007 | Girvin et al. |
| 7,523,576 | B1 | 4/2009 | Petty |
| D611,984 | S | 3/2010 | Ali et al. |
| 7,763,344 | B2 | 7/2010 | Riley et al. |
| 7,779,569 | B2 | 8/2010 | Riley et al. |
| 7,779,570 | B2 | 8/2010 | Riley |
| 7,784,209 | B2 | 8/2010 | Greer |
| 7,784,210 | B2 | 8/2010 | Riley et al. |
| 7,818,908 | B2 | 10/2010 | Greer |
| 7,823,310 | B2 | 11/2010 | Jain et al. |
| 7,877,915 | B2 | 2/2011 | Jain et al. |
| 7,883,018 | B2 | 2/2011 | Riley et al. |
| 7,918,045 | B2 | 4/2011 | Riley |
| 8,011,125 | B2 | 9/2011 | Riley et al. |
| 8,042,293 | B1 | 10/2011 | Bennett et al. |
| 10,249,221 | B2 | 4/2019 | Davis et al. |
| 10,297,170 | B2 | 5/2019 | Davis et al. |
| 10,325,525 | B1 * | 6/2019 | Davis ................ A61B 90/90 |
| 10,997,874 | B1 | 5/2021 | Kraft et al. |
| 11,232,719 | B1 | 1/2022 | Kraft et al. |
| 11,238,759 | B1 | 2/2022 | Staudinger et al. |
| 11,587,470 | B1 * | 2/2023 | Davis ................ B05D 1/00 |
| 11,651,708 | B1 | 5/2023 | Kraft et al. |
| 11,694,580 | B2 | 7/2023 | Staudinger et al. |
| 11,715,394 | B1 | 8/2023 | Kraft et al. |
| 12,142,166 | B1 | 11/2024 | Kraft et al. |
| 2002/0152928 | A1 | 10/2002 | Lawandy et al. |
| 2002/0176973 | A1 | 11/2002 | Keiser |
| 2003/0001381 | A1 | 1/2003 | Riley |
| 2003/0003249 | A1 | 1/2003 | Benim et al. |
| 2003/0011190 | A1 | 1/2003 | Ryan |
| 2004/0060216 | A1 | 4/2004 | Riley |
| 2004/0068906 | A1 | 4/2004 | Riley et al. |
| 2004/0128892 | A1 | 7/2004 | Paul et al. |
| 2004/0148836 | A1 | 8/2004 | Riley |
| 2004/0244251 | A1 | 12/2004 | Riley |
| 2005/0091896 | A1 | 5/2005 | Kotik et al. |
| 2005/0108912 | A1 | 5/2005 | Bekker |
| 2005/0279001 | A1 | 12/2005 | Riley |
| 2005/0281989 | A1 | 12/2005 | Finger |
| 2006/0113788 | A1 | 6/2006 | Riley |
| 2006/0230661 | A1 | 10/2006 | Bekker |
| 2006/0236578 | A1 | 10/2006 | Saint et al. |
| 2006/0242875 | A1 | 11/2006 | Wilson et al. |
| 2006/0261958 | A1 | 11/2006 | Klein et al. |
| 2007/0089342 | A1 | 4/2007 | Jain et al. |
| 2007/0120358 | A1 * | 5/2007 | Waggoner ................ G09F 3/005 283/81 |
| 2007/0243361 | A1 | 10/2007 | Riley et al. |
| 2007/0257113 | A1 | 11/2007 | Davis et al. |
| 2008/0098636 | A1 | 5/2008 | Greer |
| 2008/0236011 | A1 | 10/2008 | Bekker |
| 2009/0031602 | A1 | 2/2009 | Riley |
| 2009/0094872 | A1 | 4/2009 | Ali et al. |
| 2009/0094873 | A1 | 4/2009 | Riley |
| 2009/0193701 | A1 | 8/2009 | Greer |
| 2009/0277061 | A1 | 11/2009 | Jain et al. |
| 2009/0282717 | A1 | 11/2009 | Jain et al. |
| 2010/0071241 | A1 | 3/2010 | Jain et al. |
| 2010/0253060 | A1 | 10/2010 | Riley et al. |
| 2010/0281724 | A1 | 11/2010 | Greer et al. |
| 2011/0042933 | A1 | 2/2011 | Landsman et al. |
| 2012/0210620 | A1 | 8/2012 | Jain et al. |
| 2013/0056974 | A1 * | 3/2013 | Jain ................ G09F 3/005 283/99 |
| 2014/0190631 | A1 * | 7/2014 | Cho ................ C09J 7/20 524/379 |
| 2016/0335928 | A1 * | 11/2016 | Lux ................ G09F 3/10 |

FOREIGN PATENT DOCUMENTS

| | | |
|---|---|---|
| EP | 2806594 A1 | 11/2014 |
| FR | 960859 A | 4/1950 |
| GB | 561777 A | 6/1944 |
| GB | 2045718 A | 11/1980 |
| GB | 2160492 A | 12/1985 |
| GB | 2228915 A | 9/1990 |
| JP | H08190350 A | 7/1996 |
| JP | H08299035 A | 11/1996 |
| JP | 3032299 U | 12/1996 |
| JP | H10207374 A | 8/1998 |
| JP | H1115383 A | 1/1999 |
| JP | 2001316921 A | 11/2001 |
| JP | 2002117190 A | 4/2002 |
| JP | 2002351321 A | 12/2002 |
| JP | 2003066849 A | 3/2003 |
| JP | 2003157010 A | 5/2003 |
| JP | 2003164307 A | 6/2003 |
| JP | 2006039209 A | 2/2006 |
| WO | 9612618 A1 | 5/1996 |
| WO | 9823081 A1 | 5/1998 |
| WO | 9918817 A1 | 4/1999 |
| WO | 0239412 A2 | 5/2002 |
| WO | 03003331 A2 | 1/2003 |
| WO | 2004028826 A2 | 4/2004 |
| WO | 2005064574 A1 | 7/2005 |
| WO | 2006007356 A1 | 1/2006 |
| WO | 2007021375 A2 | 2/2007 |
| WO | 2007133906 A2 | 11/2007 |
| WO | 2008079952 A2 | 7/2008 |
| WO | 2009099787 A1 | 8/2009 |
| WO | 2009137195 A1 | 11/2009 |
| WO | 2010129131 A1 | 11/2010 |
| WO | WO-2017002930 A1 * | 1/2017 ............ C09J 11/04 |

OTHER PUBLICATIONS

Non-Final Office Action, dated Jan. 6, 2021, 8 pages, issued in U.S. Appl. No. 17/013,065.
Non-Final Office Action, dated Nov. 25, 2022, 8 pages, issued in U.S. Appl. No. 17/659,140.
Non-Final Office Action, dated Oct. 30, 2017, 14 pages, issued in U.S. Appl. No. 15/403,922.
Non-Final Office Action, dated Oct. 6, 2022, 16 pages, issued in U.S. Appl. No. 17/588,405.
Non-Final Office Action, dated Sep. 16, 2022, 9 pages, issued in U.S. Appl. No. 17/307,622.
Notice of Allowance, dated Jan. 11, 2021, 11 pages, issued in U.S. Appl. No. 16/418,723.
Notice of Allowance, dated Oct. 5, 2021, issued in U.S. Appl. No. 17/090,883.
Notice of Allowance, dated Oct. 19, 2022, 8 pages, issued in U.S. Appl. No. 16/426,708.
Notice of Allowance, dated Sep. 2, 2022, 9 pages, issued in U.S. Appl. No. 17/514,620.
Notice of Allowance, dated Sep. 29, 2021, issued in U.S. Appl. No. 17/013,065.
Notice of Allowance, dated Jan. 9, 2023, 8 pages, issued in U.S. Appl. No. 17/307,622.

(56) References Cited

OTHER PUBLICATIONS

Notice of Allowance, dated Jul. 18, 2024, 8 pages, issued in U.S. Appl. No. 18/227,853.
Notice of Allowance, dated Aug. 26, 2024, issued in U.S. Appl. No. 18/346,690.
Notice of Allowance, dated Feb. 17, 2023, 7 pages, issued in U.S. Appl. No. 17/588,405.
Notice of Allowance, dated Mar. 10, 2023, 7 pages, issued in U.S. Appl. No. 17/659,140.

* cited by examiner

BUSINESS FORM AND METHODS OF MAKING AND USING SAME

RELATED APPLICATIONS

This application is a continuation of U.S. patent application Ser. No. 16/426,708, filed May 30, 2019, which is a continuation-in-part of U.S. patent application Ser. No. 15/676,670, filed Aug. 14, 2017, which is a continuation-in-part of U.S. patent application Ser. No. 15/180,593, filed Jun. 13, 2016. U.S. patent application Ser. No. 15/180,593 claims priority to U.S. Provisional Application No. 62/175,055, filed on Jun. 12, 2015, U.S. Provisional Application No. 62/247,863, filed on Oct. 29, 2015, and U.S. Provisional Application No. 62/256,465, filed on Nov. 17, 2015. The disclosures of each of these applications are incorporated by reference in their entireties herein.

FIELD OF USE

The disclosure relates generally to the field of business forms, such as wristband forms, wristband and label forms, forms having cards, and other such business forms. More specifically, the disclosure relates to business forms comprising a control bond adhesive.

SUMMARY

The following presents a simplified summary of the invention in order to provide a basic understanding of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In some aspects, the techniques described herein relate to a method of making a business form, including: using a control bond adhesive created by mixing: (i) a first quantity of an adhesive; (ii) a second quantity of water; (iii) a third quantity of gypsum; and (iv) a fourth quantity of fumed silica; removably securing a first portion of said business form to a second portion of said business form.

In some aspects, the techniques described herein relate to a method, wherein said business form includes a wristband.

In some aspects, the techniques described herein relate to a method, wherein at least one of said first portion and said second portion includes a wristband.

In some aspects, the techniques described herein relate to a method, wherein said first quantity, said second quantity, said third quantity, and said fourth quantity are disparate.

In some aspects, the techniques described herein relate to a method, wherein at least one of said first quantity, said second quantity, said third quantity, and said fourth quantity is the same as another of said first quantity, said second quantity, said third quantity, and said fourth quantity.

In some aspects, the techniques described herein relate to a method, wherein said control bond adhesive is disposed on said business form in a pattern.

In some aspects, the techniques described herein relate to a method, wherein said first portion is a part of a first ply of said business form and said second portion is a part of a second ply of said business form, said second ply including a release agent.

In some aspects, the techniques described herein relate to a method, wherein said control bond adhesive further includes a color pigment.

In some aspects, the techniques described herein relate to a method, wherein said business form includes at least one label.

In some aspects, the techniques described herein relate to a method of making a business form, including: using a control bond adhesive created by mixing: (i) a first quantity of an adhesive; (ii) a second quantity of soft water; (iii) a third quantity of gypsum; and (iv) a fourth quantity of fumed silica; and wherein, a first portion of said business form is temporarily secured to a second portion of said business form using said control bond adhesive;

In some aspects, the techniques described herein relate to a method, wherein said business form includes a plurality of wristbands.

In some aspects, the techniques described herein relate to a method, wherein said business form includes a wristband.

In some aspects, the techniques described herein relate to a method, wherein said wristband includes a security slit.

In some aspects, the techniques described herein relate to a method, wherein at each end of said first portion is inboard said second portion.

In some aspects, the techniques described herein relate to a method, wherein said first portion is formed of a solitary ply.

In some aspects, the techniques described herein relate to a method, wherein said control bond adhesive is applied to said business form in a solitary layer.

In some aspects, the techniques described herein relate to a method, wherein only a part of said control bond adhesive is applied to said business form in a pattern.

In some aspects, the techniques described herein relate to a business form including a first portion and a second portion, said first portion being removably secured to said second portion via a control bond adhesive, said control bond adhesive including a mixture including an adhesive, water, gypsum, and silica.

In some aspects, the techniques described herein relate to a business form, further including a wristband and labels.

In some aspects, the techniques described herein relate to a business form, wherein said wristband is rectangular and is devoid of said control bond adhesive except for an end thereof.

DETAILED DESCRIPTION

Many wristband designs require multiple steps in order to remove the wristband from its liner and subsequently affix it to the wearer. For example, the user may be required to remove the liner in order to expose adhesive, or to fold a part of the wristband over the face portion in order to secure the wristband in place. Some wristbands include adhesive on both ends, which may make it difficult for the user to affix the wristband without attaching the adhesive to unattended areas. Additionally, this may make it difficult to remove the wristband when desired.

Other wristbands may include two layers of material, fastened together with adhesive. Here, the wristband is usually thicker and heavier. Still further designs include a paper layer which is not water resistant that tends to get torn and tattered. According to these designs, a wristband portion is permanently adhered to a paper backing sheet which is die cut in a form, to form a two-layer wristband. The wristband, consisting of the backing layer and the wristband portion, is removed from the form leaving a wristband-shaped hole in the form. This may be undesirable, because the holes in the form may prevent the form from being able to pass through a printer multiple times.

One embodiment of the present invention, described in detail herein, provides for a wristband which may be removed from a form via one generally continuous motion, and which, upon removal, may be conveniently secured to a wearer as-is. The wristband may be configured to include only a single layer of a light, synthetic (or other similar) material, thus making the wristband approximately half of the thickness of traditional wristbands currently on the market. Finally, the synthetic material may be water and tear resistant such that the wristband will not tear when removed from the backing sheet prior to affixing the wristband to the person. The wristband may be configured to be removed from a form without leaving a hole in the form, thus leaving the backing sheet intact such that the form may be passed through a printer multiple times.

Figure 1:
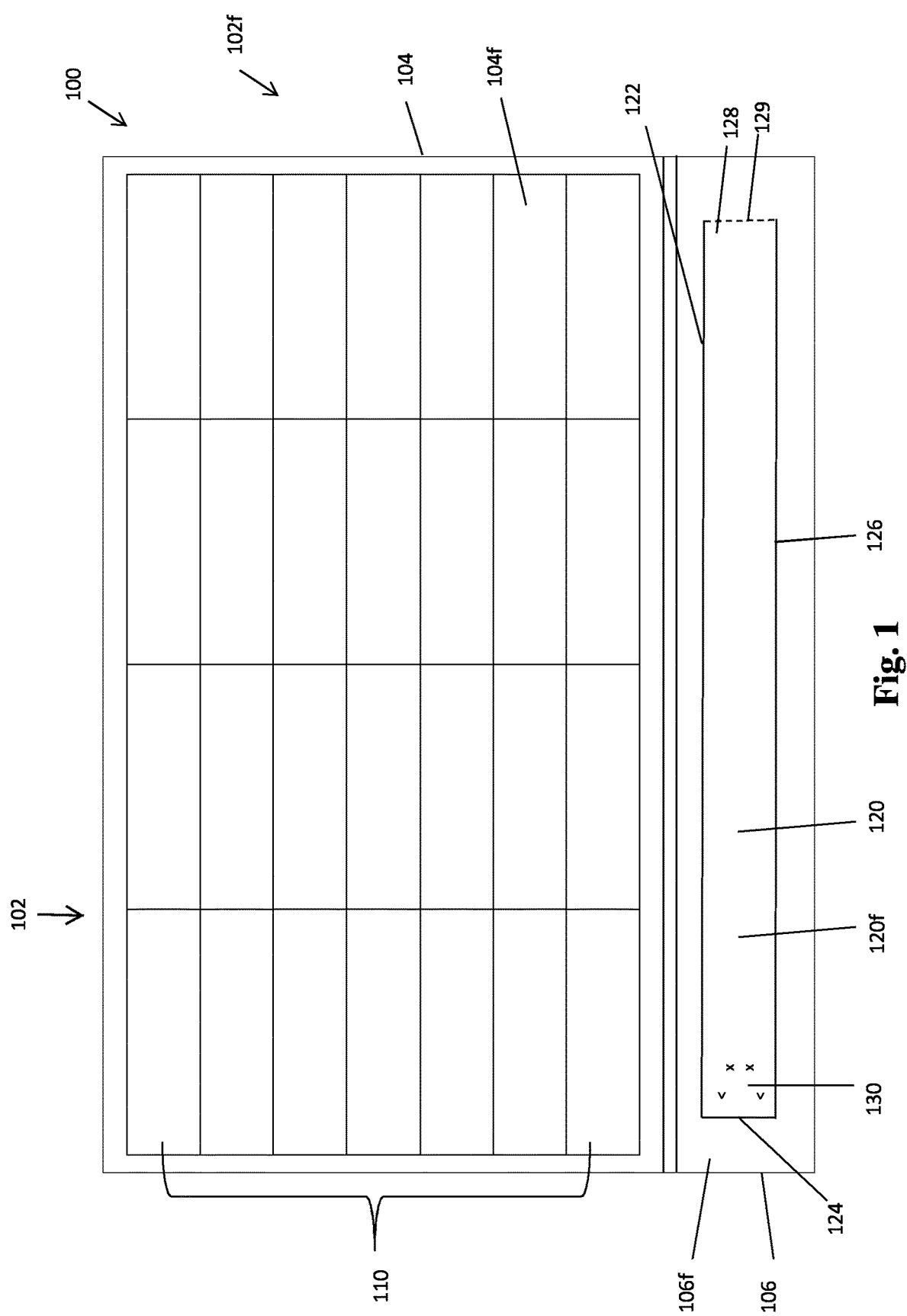
FIG. 1 is a front side view of a combination wristband and label form according to one embodiment of the invention.

With reference now to the figures, FIG. 1 shows a combination wristband and label form 100 according to one embodiment of the invention. The form 100 includes a front sheet 102 adhered to a backing sheet 140. The front sheet 102 has a front side 102f and a back side 102b. The front sheet 102 may in some embodiments be separated into a top portion 104 and a bottom portion 106 having a relatively small gap therebetween. The top portion 104 and the bottom portion 106 may each have a front face 104f and 106f, respectively.

The front surface 104f of the top portion 104 may include a plurality of labels 110. The labels 110 may be arranged in columns and rows, for example, 4×6. However, the labels 110 may be provided in any combinations of columns (e.g., 1, 2, 3, 4, etc.) and rows (e.g., 1, 2, 3, 4, etc.). The labels 110 may be configured to receive indicia. Accordingly, the front surface 104f may be constructed of paper or other appropriate textile sufficient for receiving ink, e.g., from a printer or other marking device.

The labels 110 may have a variety of constructions. For example, the figures illustrate the labels 110 as having a generally rectangular configuration. However, the labels 110 may be square, circular, polygonal, etc. Additionally, a combination of label configurations may be employed on a single form 100.

The bottom portion 106 may comprise one or more wristbands 120. The wristbands 120 may be configured to be printable. In some embodiments, the form 100 may be configured to be passed through a printer so that indicia (e.g., patient name, patient medications, machine readable information such as barcodes, et cetera) may be printed directly on the wristband 120.

The wristband 120 may be defined by two longitudinally opposing sides (or ends) 122 and 126, which may be die cut into the bottom portion front face 106f, and two laterally opposing sides (or ends) 124 and 128. One of the laterally opposed sides, e.g., side 128, may include perforations 129. Optionally, one or more of the laterally opposed sides, e.g., side 124 and/or 128, may contain an area of adhesive 132 (FIG. 2) on a backside 120b of the wristband 120. The adhesive 132 may keep the end 124 secured to the backing sheet 140 as described below. The wristband 120 may be substantially held into position via the adhesive patch 132 and the perforated side 128. The wristband 120 may contain no adhesive apart from the adhesive 132 adjacent the end 124.

In another embodiment, the wristband backside 120b and/or the backing sheet 140 may be coated with a control bond chemical (also referred to herein as a control bond adhesive, control bond coating, etc.). Traditionally, dry adhesives are used and require the application of two or more layers in order to achieve the desired results. For example, for the dry adhesive to work correctly, a release coating must first be applied to one ply, and another coating that provides for temporary adhesion with the first ply must be applied to the other ply. Additional layers of coating may be further required. Here, the control bond agent is configured such that only a single layer is required, thus making the application quicker, easier, and less expensive, and the thickness of the wristband can be reduced.

In one embodiment, the control bond adhesive coating covering adhesive area 132 and/or other adhesive areas discussed herein may comprise an effective amount of a flexible adhesive, water, sulfates, silica, and optionally, pigment. The flexible adhesive may be any adhesive that is flexible when dry. Preferably, the adhesive is a water-based adhesive, such as a product from the line of Swift®Tak adhesives. In an embodiment, the adhesive is a desirable Swift®Tak adhesive (e.g., Swift®Tak 48572). In order for the control bond coating to achieve its desired function, the water in the mixture may preferably be soft water. Soft water may be naturally occurring, and is classified by the low amount of dissolved minerals found therein. In many cases, hard water may be softened using a filtration technique. In one embodiment, the water used in the release coating mixture is softened via treatments of the water with activated coconut coir, or activated charcoal from coconut husk (ACC). Other water treatment methods may alternately, or additionally, be utilized, including but not limited to reverse osmosis, activated carbon, etc.

In embodiments, the sulfate is calcium sulfate ($CaSO_4$). The calcium sulfate may be helpful for bringing together the components of the mixture. The silica may be fumed silica, which is added as a thickening agent. Finally, the pigment, which may optionally be included as part of the release coating mixture, may desirably be water based. The pigment may be added such that a user can see where the release coating is applied in real time. In embodiments, the pigment may disappear as the control bond coating cures such that it does not undesirably change the aesthetics of the final product.

The adhesive to water ratio may be about 60:40, preferably 55:45, and most preferably about 56:44. In one embodiment, the composition comprises about 4 pounds of adhesive and about 3 pounds of water. In another embodiment, the amount of adhesive is between about 3 and 4 pounds, and the amount of water is between about 2 and 3 pounds. For example, the amount of adhesive may be about 3.6 pounds, and the amount of water may be about 2.8 pounds.

In embodiments, it may be preferable to increase the degree of adhesion. Here, the ratio of adhesive to water may be adjusted such that the amount of adhesive is increased and the amount of water is decreased.

The measurable weight of calcium sulfate (gypsum) and fumed silica may be substantially smaller than the amount of adhesive and water. Accordingly, it may be preferable to measure the amount of gypsum and fumed silica in terms of volume. In one embodiment, about 1 teaspoon of gypsum is provided as part of the composition. The amount of fumed silica is about 20 teaspoons. In another embodiment, the amount of gypsum is between about 1 and 2 teaspoons, and the amount of fumed silica is between about 19 and 25 teaspoons. In still another embodiment, the amount of gypsum is about 1.3 teaspoons, and the amount of fumed silica is about 19 heaping teaspoons.

In still another embodiment, the amount of adhesive is between about 1 and 2 kg (1000 g and 2000 g), preferably between about 1.4 and 1.8 kg, and most preferably about 1.6 kg (about 1632 g). The amount of water is between about 1 and 2 kg (1000 g and 1500 g), preferably between about 1.1 kg and 1.3 kg, and most preferably about 1.3 kg (about 1270 g). The amount of gypsum is between about 12 and 16 g, preferably between about 13 and 15 g, and most preferably about 14.87 g. Finally the amount of fumed silica ranges from about 13 g to about 24 g, preferably from about 15 g to 22 g, and most preferably about 16 g.

Optionally, an amount of pigment is provided along with the adhesive, water, gypsum, and fumed silica. The amount of pigment may be just enough so that the composition has a tint, or color, and may be based on the preferences of the user.

The components of the composition may be blended together with a cutting blade to ensure the materials are adequately combined. Other mixing apparatus and methods known to those of skill in the art may be utilized for mixing together the components.

When mixed, the composition may have a viscosity close to that of water. In other words, the composition may have a low viscosity such that it may be easily applied to the combined wristband and label form as described herein. In embodiments of higher amounts of adhesive, the viscosity may additionally be higher.

The control bond adhesive composition may be applied to the combined wristband and label form according to methods known to those of skill in the art. Using a roll-coater device, the control bond adhesive may be applied to the backing in the area of the wristband. The control bond adhesive may be applied in a pattern. The pattern may be configured such that removal of the wristband provides the user with a "zipper" effect—the user may hear a noise similar to that heard during operation of a zipper, and further feel as if the wristband were being unzipped from the backing.

The wristband ply (e.g., the front sheet 102) may then be mated with the backing sheet 140. The paper side (e.g., backing sheet 140) may be heated up, causing the pores of the paper to expand. The control bond adhesive therefore dries within the pores of the paper, resulting in a desirable temporary control bond.

The wristband 120 may be generally rectangular, as shown. Alternatively, the wristband 120 may take on other desirable shapes. In one embodiment, a height of the adhesive end (e.g., end 124) may be less than a height of the remainder of the wristband 120 (including being less than the height of the end 128).

The wristband 120 may be further equipped with security slits 130. The security slits 130 may be configured to tear, should the wristband 120 be tampered with after the wristband 120 is applied to a wearer. This may be beneficial to ensure that the wristband 120 remains associated with the intended wearer, particularly in a healthcare environment where the wristband 120 includes patient-specific information.

The bottom portion 106 (including the wristband 120) may be constructed of a synthetic material, such as polyester fabric or plastic, for example. Other materials may additionally, or alternately, be appropriate. Those of skill in the art may recognize that it may be beneficial for the wristband 120 material to be resistant to water or other liquid, which may cause the integrity of the wristband 120 to be prematurely compromised.

Figure 2:
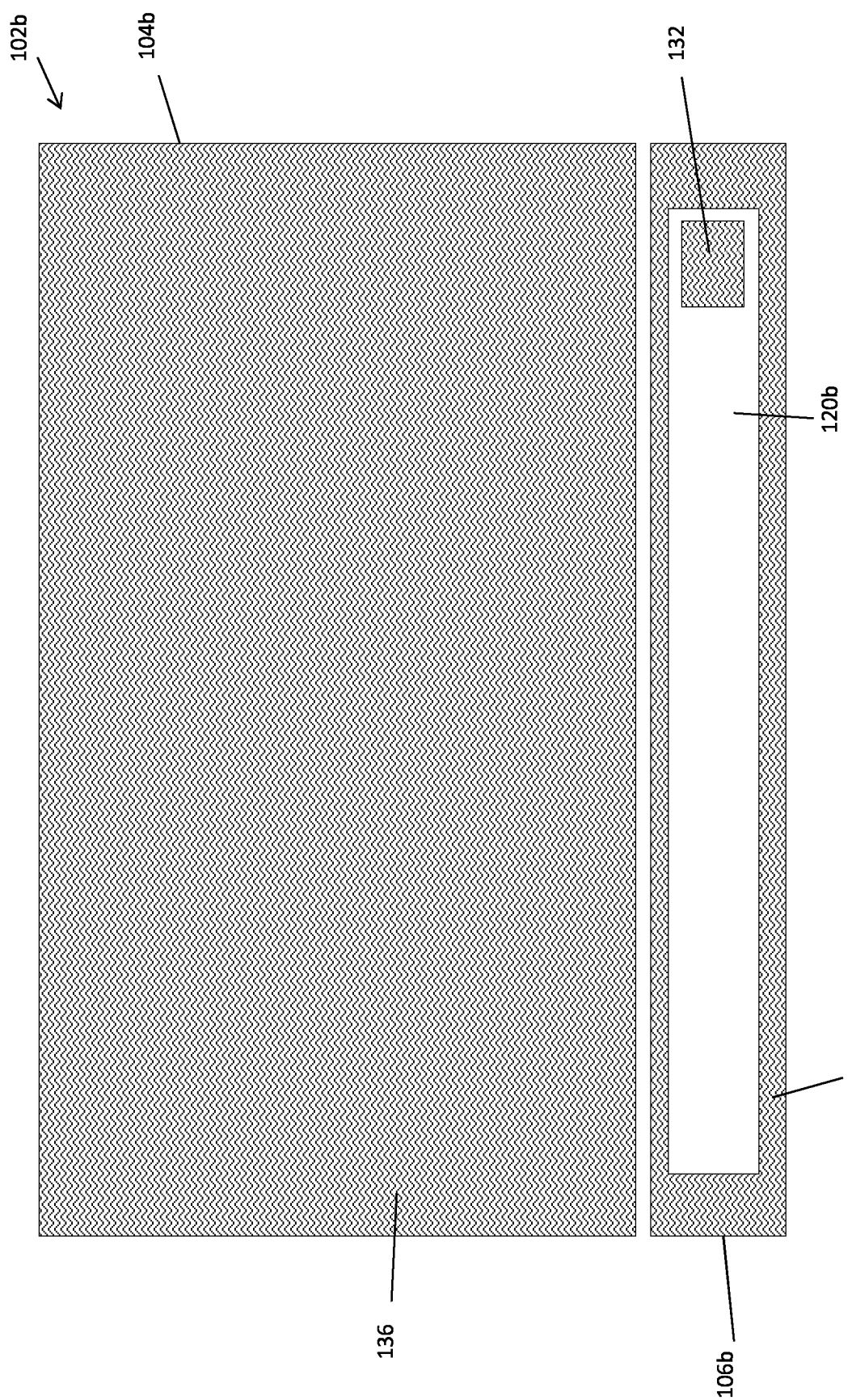
FIG. 2 is a back side view of the combination wristband and label form according to the embodiment of FIG. 1.

Attention is now directed to FIG. 2, which shows an embodiment of the back side 102b of the form 100. The back side 102b may include a back face 104b of the top portion 104 and a back face 106b of the bottom portion 106. The back face 104b of the top portion 104 may include an adhesive area 136. The adhesive area 136 may allow for the labels 110 to be releasably secured to the backing sheet 140. The back face 106b of the bottom portion 106 may additionally have adhesive areas 132, described above, and 134. The adhesive area 134 may correspond to the area surrounding the wristband 120 which remains in place when the wristband 120 is removed from the form 100.

Figure 3:
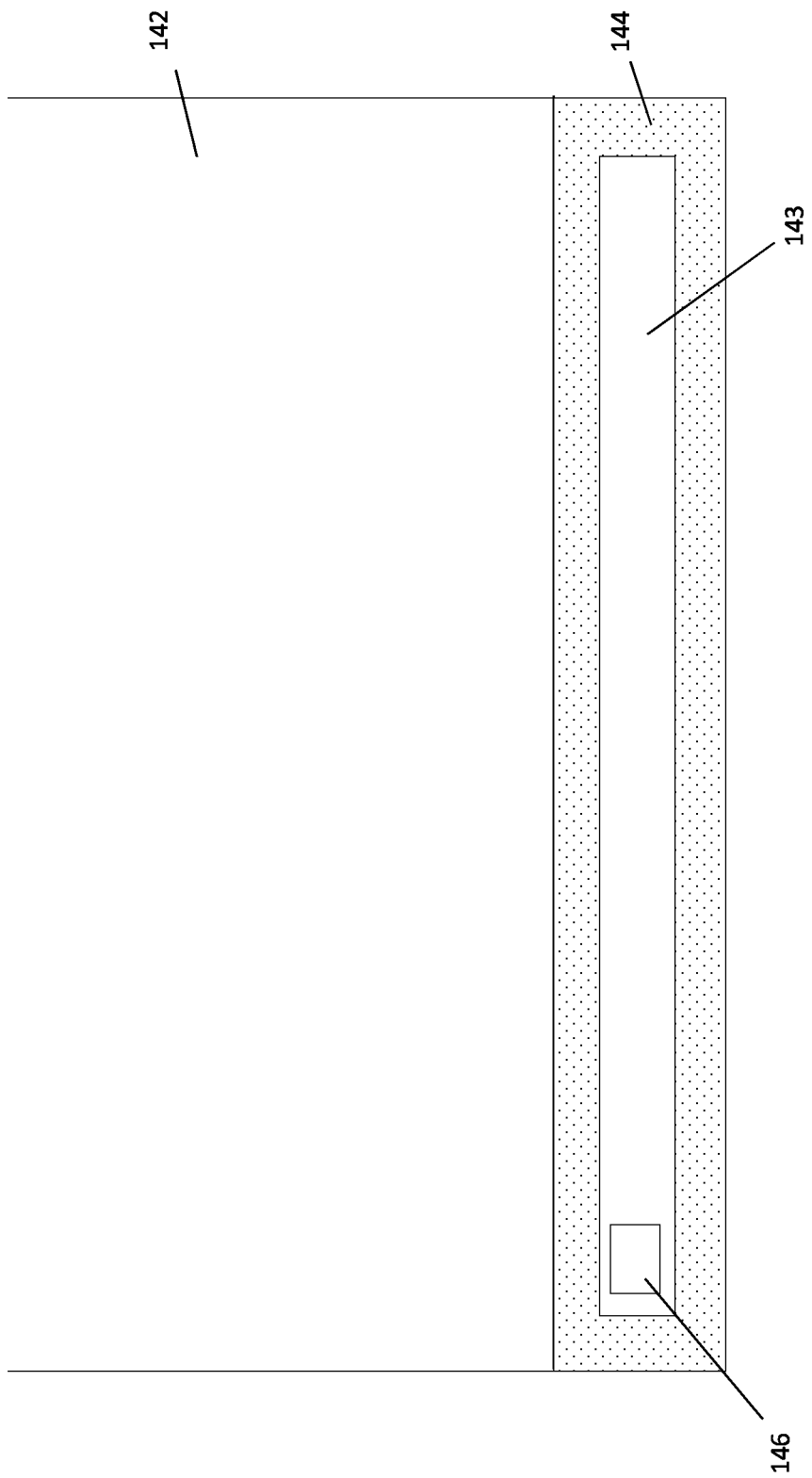
FIG. 3 is a front view of a backing sheet that is attached to a back side of the form of FIG. 1.

The adhesive areas 132, 134, and 136 of the back faces 104b and 106b may adhere to the backing sheet 140, illustrated in FIG. 3. In certain embodiments, the backing sheet 140 may be constructed of paper or a synthetic resin, and may include a layer of silicone (or another similar release material) in the areas corresponding to the adhesive areas 132, 134, and 136. For example, the adhesive area 136 may releasably adhere to the silicone material 142, adhesive area 132 may releasably adhere to silicone material 146, and adhesive area 134 may adhere to silicone material 144. The silicone material 144 may be applied in a pattern. The patterned silicone 144 may allow for a more permanent adhesion between the backing sheet 140 and the front sheet 102 in areas void of silicone (e.g., the bond between the area of the bottom portion 106 surrounding the wristband 120 and the backing sheet 140 may be stronger than the bond between the top portion 104 and the backing sheet). This may keep the area of the bottom portion 106 surrounding the wristband 120 in place on the backing sheet 140. In some embodiments, the silicone material 144 may be omitted so that the area of the bottom portion 106 surrounding the wristband 120 permanently adheres to the backing sheet 140. In embodiments, one or more adhesive areas (e.g., the adhesive area 132, 134, 136, etc.) may not be present, thus reducing the need for silicone on the backing sheet 140.

When the wristband 120 is removed from the form 100, the area 143 of the backing sheet 140 behind the wristband 120 may remain intact. Such may provide several benefits over prior art wristbands. For example, as noted above, prior art methods consisting of "punching out" the wristband from the form leaves a void that may prevent the rest of the form from being used at a later time. However, if the form remains intact, as in the present invention, it may be used multiple times, for example, to print on the labels 110. This may be beneficial because it is often desirable to print the labels 110 at different times (for example, it may be desirable to print new labels 110 to reflect changes made to medications prescribed to a patient during the course of his treatment). A new label 110, such as a label 110 leftover on the form 100, may thus be printed with the new information until all the labels 110 have been used. Of course, the labels 110 may be used for any desirable purposes, such as for labeling patient files and other documents, vials, etc. The labels 110 may all be printed with information in a single pass through the printer, or the form 100 may be passed through the printer multiple times such that the labels 110 are printed as needed.

According to one embodiment, in use, after the wristband 120 has been printed, the user may peel the side (e.g., side 124) of the wristband 120 up and away from the form 100, inserting his or her finger under the wristband side 126 until the finger exits at side 122. The user may then tear the side 128 along the perforations 129 to free the wristband 120 from the form 100. Alternately, the user may hold the wristband 100, e.g., from side 122 or 126, between his index finger and thumb, tear the side 128 along the perforations 129, and then separate the wristband 120, including the side 124 having the adhesive 132, from the form 100. In this way, the user may remove the wristband 120 from the form 100 in one generally continuous motion. The user may then attach the wristband 120 to a person's wrist by wrapping the wristband 120 around the wrist, face up, and fastening the adhesive end (e.g., side 124) to the face of the wristband 120. Such quick and convenient removal of the wristband 120 from the form 100 and its ready securement to a person's wrist may be preferable, as compared for example, to wristbands that must be removed from the associated forms in several steps or which need to be folded or otherwise reconfigured after they have been removed from the form and before they are secured to a wearer's wrist.

In another embodiment, wherein wristband 120 is secured to the backing sheet 140 via the control bond adhesive, the user may peel back one side (e.g., side 124) and remove the wristband 120 by pulling the wristband 120 away from the backing sheet 140. As described above, the control bond adhesive may provide an enhanced experience to the user, allowing the user to hear and feel the removal of the wristband 120 from the backing sheet 140.

Figure 4:
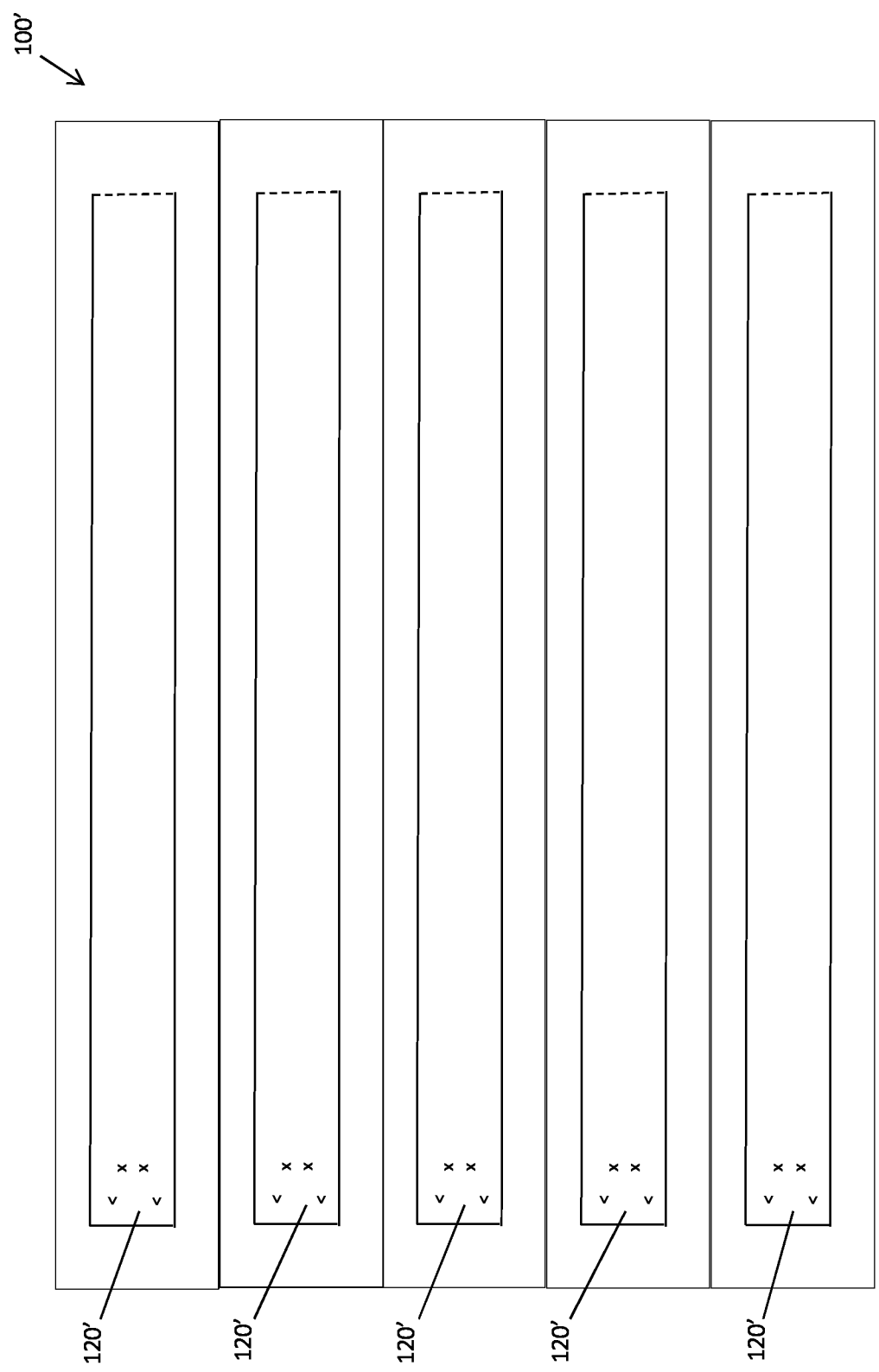
FIG. 4 is a front side view of an alternative embodiment of the form of FIG. 1.
Figure 5:
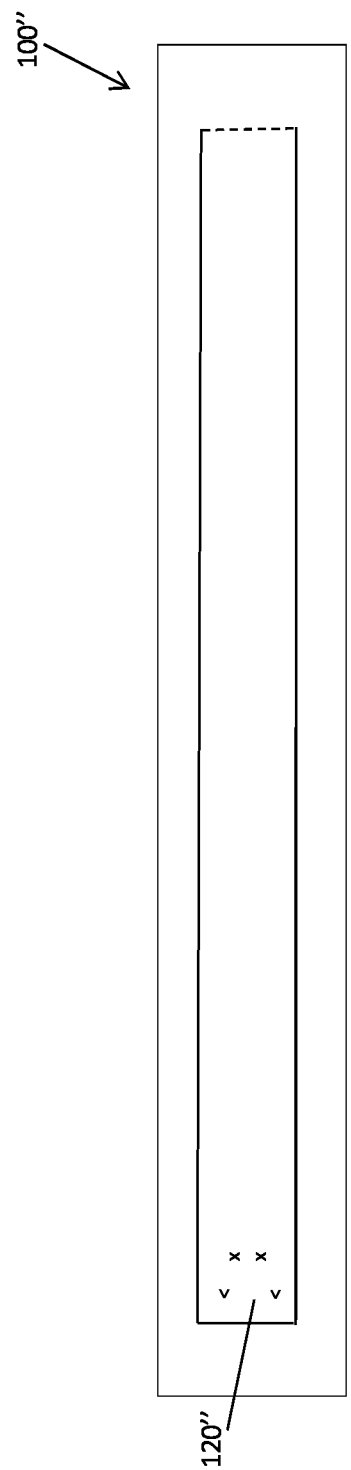
FIG. 5 is a front side view of another alternative embodiment of the form of FIG. 1.

In another embodiment, illustrated in FIG. 4, the form 100' may consist of a plurality of wristbands 120' and does not include labels 110. Alternately, the form 100" may include only a single wristband 120" as shown in FIG. 5. The form 100 may be approximately the size of a standard piece of paper (e.g., 8½"×11"), or the form 100 may be tailored to the size of the required wristbands 120 and/or labels 110. For example, if only a single wristband 120 is required, the form 100 may be only the size necessary to contain one wristband 120.

While the control bond adhesive covering the adhesive areas (e.g., adhesive area 132) is illustrated in use with a form comprising wristbands (e.g., form 100 comprising wristband and labels, form 100' comprising a plurality of wristbands, form 100" comprising a solitary wristband, etc.), the artisan will readily understand from the disclosure herein that the control bond adhesive discussed above is also usable with other products, including standalone and combination products. For example, the control bond adhesive may be used in a form comprising only labels (or other standalone products) to releasably secure the labels to a backing sheet of the form. Or, for instance, the control bond adhesive may be used in combination products, such as a business form and card combination product, a business form and tag combination product, or other such products. Indeed, the control bond adhesive may replace traditional dry adhesives in a multitude of business forms, and may be used in any form having two or more portions that are adhesively secured. The artisan will understand that the control bond adhesive may be used as desired to releasably or permanently secure two portions of a business form irrespective of the size and configuration of the business form.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A method of making a business form, comprising:
   using a control bond adhesive created by mixing: (i) a first quantity of an adhesive; (ii) a second quantity of water; (iii) a third quantity of gypsum; and (iv) a fourth quantity of fumed silica;
   removably securing a first portion of said business form to a second portion of said business form using said control bond adhesive.

2. The method of claim 1, wherein said business form includes a wristband.

3. The method of claim 1, wherein at least one of said first portion and said second portion comprises a wristband.

4. The method of claim 1, wherein said first quantity, said second quantity, said third quantity, and said fourth quantity are disparate.

5. The method of claim 1, wherein at least one of said first quantity, said second quantity, said third quantity, and said fourth quantity is the same as another of said first quantity, said second quantity, said third quantity, and said fourth quantity.

6. The method of claim 1, wherein said control bond adhesive is disposed on said business form in a pattern.

7. The method of claim 1, wherein said first portion is a part of a first ply of said business form and said second portion is a part of a second ply of said business form, said second ply comprising a release agent.

8. The method of claim 1, wherein said control bond adhesive further comprises a color pigment.

9. The method of claim 1, wherein said business form includes at least one label.

10. A method of making a business form, comprising:
    using a control bond adhesive created by mixing: (i) a first quantity of an adhesive; (ii) a second quantity of soft water; (iii) a third quantity of gypsum; and (iv) a fourth quantity of fumed silica; and
    wherein, a first portion of said business form is temporarily secured to a second portion of said business form using said control bond adhesive.

11. The method of claim 10, wherein said business form comprises a plurality of wristbands.

12. The method of claim 10, wherein said business form includes a wristband.

13. The method of claim 12, wherein said wristband includes a security slit.

14. The method of claim 10, wherein each end of said first portion is inboard said second portion.

15. The method of claim 10, wherein said first portion is formed of a solitary ply.

16. The method of claim 10, wherein said control bond adhesive is applied to said business form in a solitary layer.

17. The method of claim 10, wherein only a part of said control bond adhesive is applied to said business form in a pattern.

18. A business form comprising a first portion and a second portion, said first portion being removably secured to said second portion via a control bond adhesive, said control bond adhesive comprising a mixture including an adhesive, water, gypsum, and silica.

19. The business form of claim 18, further comprising a wristband and labels.

20. The business form of claim 19, wherein said wristband is rectangular and is devoid of said control bond adhesive except for an end thereof.

* * * * *